(12) United States Patent
Hirota

(10) Patent No.: US 6,279,331 B1
(45) Date of Patent: Aug. 28, 2001

(54) VEHICULAR REFRIGERATING CYCLE WITH A BYPASS LINE

(75) Inventor: Hisatoshi Hirota, Tokyo (JP)

(73) Assignee: TGK Co. Ltd., Tokyo (JP)

(*) Notice: Subject to any disclaimer, the term of this patent is extended or adjusted under 35 U.S.C. 154(b) by 0 days.

(21) Appl. No.: 09/543,538

(22) Filed: Apr. 5, 2000

(30) Foreign Application Priority Data

May 10, 1999 (JP) .................................................. 11-128221

(51) Int. Cl.[7] ............................................................. F25B 5/00
(52) U.S. Cl. .......................... 62/117; 62/169.4; 62/228.5
(58) Field of Search .................................. 62/244, 169.4, 62/228.3, 228.5, 117

(56) References Cited

U.S. PATENT DOCUMENTS 6,105,375 * 8/2000 Takano et al. ....................... 62/196.4
6,109,046 * 8/2000 Karl ..................................... 62/196.4
6,148,632 * 11/2000 Kishita et al. ....................... 62/196.4

* cited by examiner

Primary Examiner—William E. Tapolcai
Assistant Examiner—Mohammad M Ali
(74) Attorney, Agent, or Firm—Nilles & Nilles SC

(57) ABSTRACT

A vehicular refrigerating cycle with a by-pass line is provided, whereby even in an environment of extremely low temperature with the refrigerating cycle left at rest after being operated in cooling mode, refrigerant accumulated in a condenser can be driven out of the condenser to provide subsequent heating functions by an evaporator in a prescribed manner. A capacity control can be set such that the capacity of a compressor only is allowed to start to decrease from a maximum capacity when a compressor suction pressure ps has dropped to a value of 2 atmospheres (absolute pressure) or less in a state in which refrigerant flows through a condenser without passing through a bypass line.

7 Claims, 3 Drawing Sheets

VEHICULAR REFRIGERATING CYCLE WITH A BYPASS LINE

BACKGROUND OF THE INVENTION

1. Field of the Invention

The invention relates to a method for controlling a vehicular refrigerating cycle, said refrigerating cycle comprising a variable capacity compressor, a condenser for condensing a refrigerant, an expansion valve, an evaporator for evaporating adiabatically expanded refrigerant, a by-pass line detouring said condenser, and a line switching means for either supplying the refrigerant compressed by the compressor to the condenser in a cooling mode or into the by-pass line in a heating mode, and a vehicular refrigerating cycle of the kind as disclosed above.

High efficiency engines as gasoline-injection type engines or gasoline direct injection type engines do not develop high cooling water temperatures, compared with conventional combustion engines. Using the cooling water for heating purposes does not allow to sufficiently heat the vehicle compartment.

2. Description of the Related Art

U.S. Pat. No. 4,893,748 already proposes to use a refrigerating cycle in a vehicle not only for cooling purposes, but also for heating purposes. The refrigerating cycle contains a bypass line detouring the condenser and directing high-pressure refrigerant gas discharged from the compressor directly into an evaporator arranged inside the vehicle compartment so that heat exchange may take place in the evaporator for auxiliary heating purposes. However, if the refrigerating cycle is left at rest after an operation in the cooling mode, refrigerant tends to accumulate in the condenser. If then the refrigerating cycle is operated thereafter in the heating mode, only a small amount of refrigerant is circulated deteriorating the auxiliary heating effect.

This disadvantage calls for operating the refrigerating cycle prior to an operation in the auxiliary heating mode for a short time in the cooling mode (filling operation) to collect refrigerant stored in the condenser and to transfer it to the evaporator or an accumulator.

To convey refrigerant out of the condenser in this condition it would be necessary that the evaporator pressure was lower than the condenser pressure. However, when the refrigerating cycle contains a variable capacity compressor the capacity of which automatically decreases with a decrease of its suction pressure, the condenser pressure automatically drops to about 2 atm. (absolute atmospheric pressure) if the ambient atmospheric temperature has dropped, e.g. to about −10° C. It is known from practice to use a solenoid-operated pressure regulating valve for controlling the capacity of the variable capacity compressor in a refrigerating cycle of this kind. However, even if the solenoid is supplied with a permanent maximum driving operation current of, e.g., 1 Ampere (falling within a range in which the coil of the solenoid is not burnt) the suction pressure does not decrease to more than to e.g. 2.3 atm. (absolute atmospheric pressure). Consequently, the evaporator pressure remains higher than the condenser pressure. Refrigerant stored in the condenser fails to flow out of the condenser. In case of an ambient temperature of −30° C. the condenser pressure even drops to about 1 atm. (absolute atmospheric pressure) so that it is even more difficult to collect refrigerant stored in the condenser for the heating mode and to obtain a sufficient heating effect.

EP 780 254 A discloses to provide an ejector in a heating loop to additionally obtain refrigerant from the condenser for the auxiliary heating mode operation.

DE 19 746 773 discloses a refrigerating cycle with a variable capacity compressor and a method for controlling the compressor when operating the refrigerating cycle in the heating mode. According to said method the refrigerating cycle directly starts in its heating mode. Refrigerant is sucked out of the condenser via a separate by-pass line connecting the inlet of the condenser and the inlet of the compressor. Furthermore, the capacity control mechanism of the compressor is overruled in the heating mode at least in case of low ambient temperatures such that said compressor operated with high capacity. However, this is carried out to generally increase the refrigerant pressure.

OBJECTS AND SUMMARY OF THE INVENTION

It is an object of the invention to provide a method for controlling a refrigerating cycle of the kind as disclosed as well as a vehicular refrigerating cycle allowing to achieve a sufficiently good auxiliary heating effect in the heating mode, particularly in case of low ambient temperature. The invention should allow to use a sufficient amount of refrigerant for the heating function by the evaporator which refrigerant first has been accumulated in the condenser when the refrigerating cycle was switched off and kept at rest after a cooling mode operation.

As soon as the refrigerating cycle ought to be operated in its heating mode, e.g. when being left at rest after an operation in a cooling mode, first a cooling mode setting is made and a pressure drop is adjusted declining from said condenser to said evaporator for a predetermined period of time, so that at least a part of refrigerant stored in the condenser is driven out of the condenser, e.g. into the evaporator. Then the refrigerating cycle is switched to the heating mode. A sufficiently large amount of refrigerant can be used for the heating function. The heating function can be smoothly controlled.

Even in an environment of extremely low ambient temperature, the refrigerating cycle left at rest after a cooling mode operation, expediently is operated again in the cooling mode for a short while such that the pressure in the evaporator is forced to decrease below the condenser pressure to gain refrigerant accumulated in the condenser for the heating function by the evaporator. During the heating mode a sufficiently strong and controllable heating effect can be achieved in a predetermined manner.

According to a further aspect of the method the evaporator pressure is adjusted lower than the condenser pressure for a predetermined period of time in a cooling mode setting by a compressor capacity control means. This is carried out by intentionally postponing the start of a decrease of the capacity of the compressor from a maximum until the suction pressure has dropped to a sufficiently low level.

A suction pressure value of about 2 atm. is sufficiently low to assure a useful heating effect even in case of low ambient temperatures of about −10° C. However, the suction pressure value even can be made lower, e.g. to 1 atm. or less in case of lower ambient temperatures of about −30° C.

In another embodiment of the refrigerating cycle the setting means postpones the start of the decrease of the capacity of the compressor from maximum until a suction pressure of 1 atmosphere or less has been reached. It is even possible, to adjust the setting means so that the start of the decrease of the capacity is postponed until the suction pressure has decreased to 0.3 atmospheres.

It can be advantageous to postpone the start of the decrease of the capacity from a high setting like the maximum setting to a point in time immediately prior to a state in which the refrigerant flows through the by-pass line without passing through said condenser (start of the heating mode operation of the refrigerating cycle).

Expediently the solenoid actuated pressure regulating valve normally used to control the value of a control pressure adjusting the capacity setting of the compressor also is used for this filling operation. During the filling operation the current setting means supplies an overcurrent which significantly lowers the opening response pressure of the valve to the predetermined low value of the suction pressure. Due to the overcurrent the suction pressure is able to keep the valve open and to adjust a sufficiently low control pressure maintaining a high or the maximum capacity setting of the compressor.

Said overcurrent may have a magnitude approximately double as high as a maximum magnitude of a continuous operation current supplied for a long duration heating and/or cooling mode operation of said refrigerating cycle.

Said overcurrent can be supplied to maintain the maximum capacity setting of the compressor until the suction pressure value even has reached about 0.3 atmospheres. A time period of between about 30 second to about 1 minute can be sufficiently long to accordingly lower the evaporator pressure and to drive refrigerant stored in the condenser out of the condenser for the subsequent heating mode operation.

The current setting means can comprise a driving circuit connected to a control section including a control signal calculating CPU. Sensors providing decisive parameters for gaining information how to control the refrigerating cycle are connected to said control section. This allows e.g. to decide at the side of the control unit whether said control routine for lowering the suction pressure is necessary or advantageous for a subsequent heating mode operation.

BRIEF DESCRIPTION OF THE DRAWINGS

Embodiments of the invention will be explained with the help of the drawings. In the drawings is.

DESCRIPTION OF THE PREFERRED EMBODIMENTS

Figure 2:
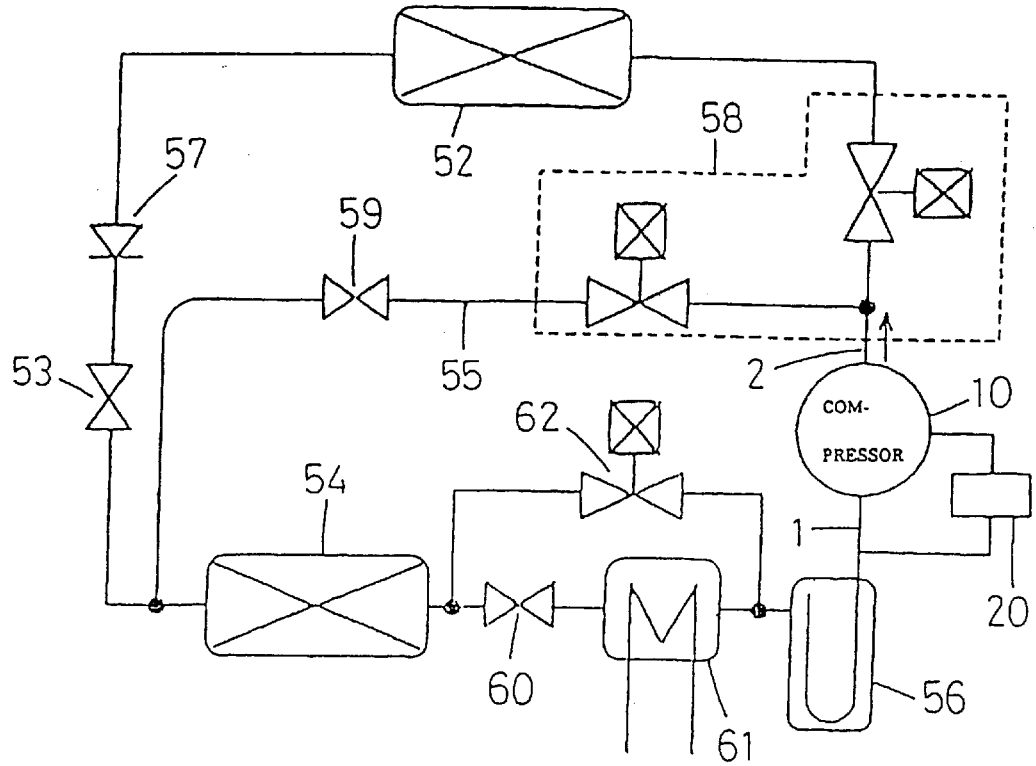

A vehicular refrigerating cycle for use in an automobile air conditioning system comprises in FIG. 2 a compressor 10, a condenser 52 arranged outside a vehicle compartment, an expansion valve 53, an evaporator 54 arranged at an air duct leading to the interior of the vehicle compartment, and an accumulator 56 for temporarily storing low-pressure refrigerant. Furthermore, a by-pass line 55 is provided detouring condenser 52, to allow auxiliary heating by means of the evaporator 54. High-pressure refrigerant gas discharged from compressor 10 in a heating mode directly flows into the evaporator 54 without passing through condenser 52. Downstream of condenser 52, e.g. upstream of expansion valve 53, a check valve 57 is situated. A line switching valve 58 serves to either direct the high-pressure refrigerant discharged by the compressor 10 to the condenser 52 or the by-pass line 55. In by-pass line 55 a constant-differential-pressure regulating valve 59 for pressure reduction purposes is situated acting as an expansion valve in the heating mode when the refrigerant flows through by-pass line 55.

Between evaporator 54 and accumulator 56 an expansion valve 60 and a heat exchanger 61 are provided. In the branch line detouring expansion valve 60 and heat exchanger 61 and on-off valve 62 is provided. Heat exchanger 61 serves to exchange heat with the refrigerant which heat is released from the engine or motor, battery or the like, of the automobile.

During cooling mode line switching valve 58 is set so that the high-pressure refrigerant discharged from compressor 10 in its entirety is directed to condenser 52. By-pass line 55 is blocked. On-off valve 62 is opened. Evaporator 54 is performing its original function to achieve a cooling effect by exchange of heat between the ambient air and the refrigerant.

For and during auxiliary heating mode line switching valve 58 is set such that all of the high-pressure refrigerant discharged from compressor 10 flows through by-pass line 55, without passing through condenser 52. On-off valve 62 is closed.

Consequently, as soon as the refrigerant, the pressure of which has been reduced while passing through the expansion valve 59 in by-pass line 55, is passing through evaporator 54, heat exchange takes place by which a sensible amount of heat, e.g. brought by the compressor 10 into the refrigerant is removed from the refrigerant. The evaporator 54 functions as a radiator for heating. Heat released from the engine or motor, the battery or the like, of the automobile and brought into the refrigerant in heat exchanger 61 enhances to the heating effect of the evaporator.

Compressor 10 in the vehicular refrigerating cycle as shown is a variable capacity compressor the capacity of which automatically decreases with decreasing compressor suction pressure. A capacity control valve 20 is associated to compressor 10.

Figure 3:
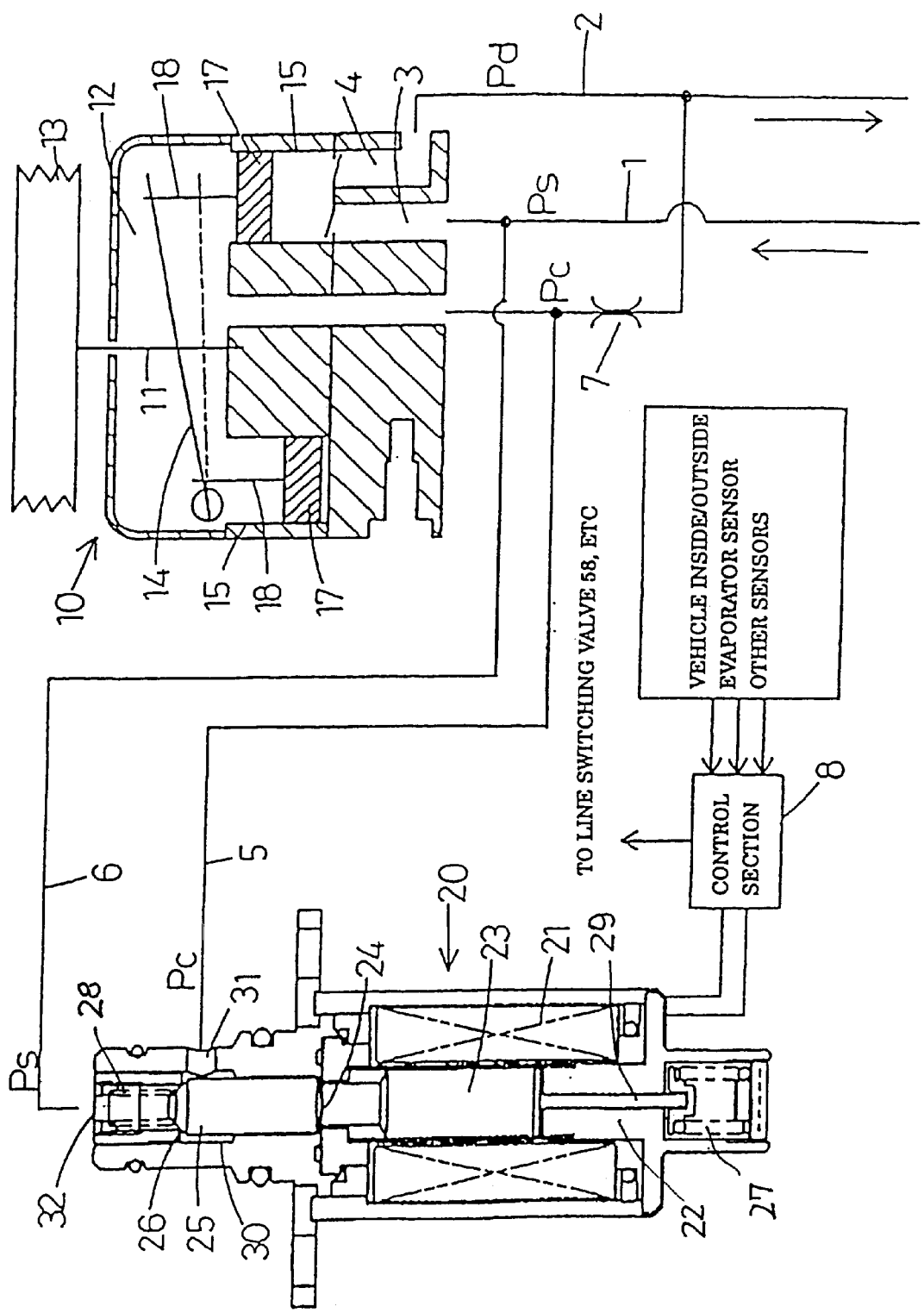

In FIG. 3 as an example of a variable capacity compressor 10 a so-called swash-plate type compressor and a capacity control valve 20 for controlling the capacity of said compressor are shown. Capacity control valve 20 variably controls the capacity which varies according to the suction pressure Ps by use of a solenoid.

In an airtight crank case 12 a rotary shaft 11 is driven by pulley 13. A rocking swashplate 14 inside crank case 12 is driven by rotary shaft 11 for a rocking motion. Said plate 14 can be adjusted in its inclination with respect to the axis of rotary shaft 11 by a varying control pressure Pc, between an inclination angle of about 90° (minimum capacity) and an acute inclination angle (e.g. as shown) (maximum capacity). In circumferentially distributed axial cylinders 15 within crank case 12 pistons 17 are slidably received for reciprocating motions. Said pistons are connected by rods 18 to rocking or swash-plate 14.

Consequently, as the inclined rocking plate 14 rocks, said pistons 17 reciprocate within their cylinders 15. Refrigerant of low-pressure (suction pressure Ps) is sucked into the cylinders 15 from suction chamber 3 and through suction valve means and then is compressed and discharged via discharge valve means into a discharge chamber 4 (discharge pressure Pd). The refrigerant is supplied to the suction chamber 3 through a suction line 1 from accumulator 56. High-pressure refrigerant is discharged from discharge chamber 4 into a downstream-side discharge line 2. Furthermore, it has to be noted that, as shown in FIG. 3, the crank case communication line 5 and discharge line 2 additionally communicate with another via a narrow leak passage 7.

The angle of inclination of rocking plate 14 varies in accordance with said control pressure Pc in crank case 12. By varying the inclination angle of rocking plate 14 the amount of refrigerant discharged from cylinders 15, i.e. the capacity of compressor 10, varies. The compressor 10 can function such that e.g. decreasing or low control pressure Pc increases the capacity while increasing or high control pressure Pc decreases the capacity. So the capacity can be variably controlled between maximum and minimum capacity setting. As long as Ps is higher than a fixed value (Ps (set), Pc=Ps; 100% capacity. If Ps≦Ps (set), Ps<Pc; capacity <100%.

Solenoid-controlled capacity control valve 20 e.g. serves to automatically control the crank case or control pressure Pc in accordance with or in proportion to a change of suction pressure Ps.

Figure 4:
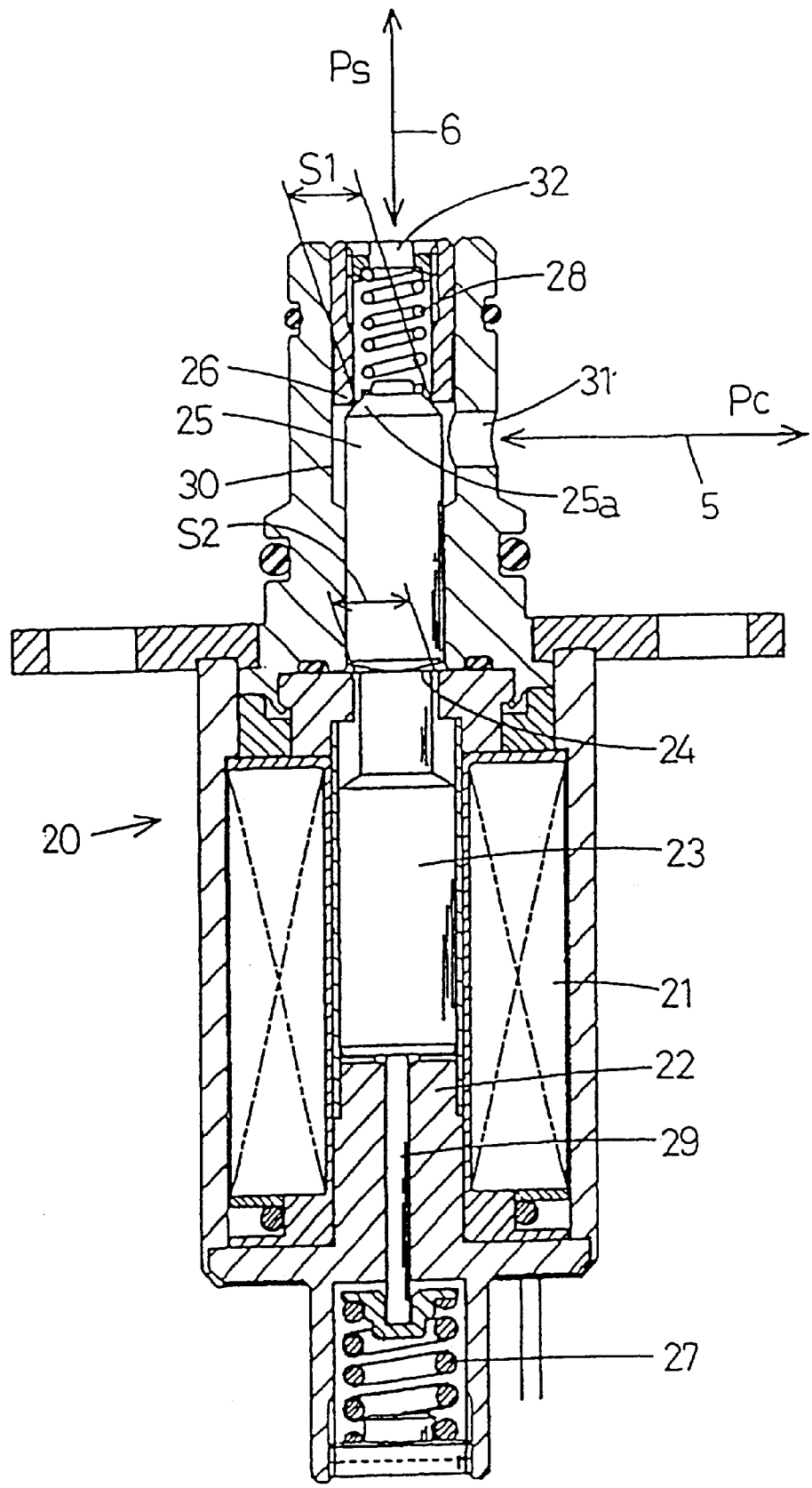

According to FIG. 3 and in more detail to FIG. 4 valve 20 includes a coil 21, a fixed iron core 22, a moveable iron core 23, an impermeable diaphragm 24 and pressure regulating coil springs 27, 28 among which spring 27 can have a higher spring force than oppositely acting spring 28. An end face of moveable iron core 23 abuts against an outer surface of diaphragm 24. The atmospheric pressure is applied on said outer surface of diaphragm 24 as well, plus the urging force of spring 27 deducted by an urging force of moveable iron core 23 attracted by fixed iron core 22 corresponding with a value of electric current supplied to coil 21. The value of the electric current can be set upon demand between no current at all and a maximum value.

At inner side of diaphragm 24 a cylindrical axially moveable pressure regulating valve element 25 is received in a space 30. The end portion of pressure regulating valve element 25 opposite to diaphragm 24 is formed as a valve closure portion 25a axially facing a valve seat 26 provided within said space 30. Space 30 is shut off from the atmosphere. A sidewardly situated connection port 31 for crank case communication line 5 (control or crank case pressure Pc) leads to space 30. Valve seat 26 is formed on a sleeve receiving pressure regulating coil spring 28. Suction pressure line 6 is connected to a connection port 32 at the free end of said sleeve and communicates with valve seat 26.

Moveable iron core 23 and pressure regulating valve element 25 are arranged in series with diaphragm 24 interposed therebetween A rod 29 axially moveable within a centre bore of fixed iron core 22 structurally connects moveable iron core 23 with a spring counterfort of pressure regulating spring 27. Pressure regulating valve element 25 is axially guided with a loose fit such that the control pressure Pc in internal space 30 acts on both its ends. An effective pressure receiving area S1 of valve seat 26 (i.e. the effective pressure receiving area of the valve closure portion 25a) is equal to an effective pressure receiving area S2 of diaphragm 24 (S1=S2). This means that the forces of pressure Pc on valve element 25 cancel each other or are balanced and do not influence the opening/closing motion of pressure regulating valve element 25. Pc acts on diaphragm 24 in opening direction of said valve.

Consequently, pressure regulating valve element 25 in closing direction is acted upon by the atmospheric pressure via diaphragm 24 and the urging closing force of coil spring 27 minus the oppositely directed urging force of the excited solenoid, i.e. the force generated by moveable iron core 23 when attracted by fixed iron core 22 due to electric current supplied to coil 21, by the force of suction pressure Ps on valve closure portion 25a inside valve seat 26 in opening direction. Pc acts on diaphragm 24 also in opening direction.

If the value of a current supplied to coil 21 is set at a fixed value, pressure regulating valve 25, 25a, 26 will open and close in accordance with variations of suction pressure Ps. As long as said valve is open control pressure Pc in crank case 12 will change accordingly by following such variations of suction pressure Ps. The capacity of the variable capacity compressor 10 changes correspondingly. Specifically, as the suction pressure Ps decreases over a fixed value, control pressure Pc equals Ps (valve open) and the capacity of the compressor will be 100% (maximum) of Ps≦said fixed value, Ps<Pc; capacity>100% (valve closed).

If pressure regulating valve 25, 25a, 26 is closed, the following sequence of operations is repeated: the refrigerant with discharge pressure Pd is supplied via leak passage 7 by degrees into crank case 12 to increase the crank case or control pressure Pc. The capacity is set to a lower capacity setting. Lower capacity setting may lead to an increase of the suction pressure Ps. If due to a consequent increase of the suction pressure Ps pressure regulating valve 25, 25a, 26 is opened again, the crank case or control pressure Pc rapidly drops to Ps.

In this manner the crank case or control pressure Pc temporarily becomes equivalent to the suction pressure Ps (valve open), thus controlling the capacity of the variable capacity compressor 10. The respective control level can be changed as desired by changing the value of current supplied to coil 21, because the solenoid determines the opening response pressure of the valve.

The value of electric current supplied to coil 21 is controlled by supplying detection signals from an engine sensor, sensors for detecting the temperatures inside and outside the vehicle compartment, an evaporator sensor, and other sensors for detecting various other conditions, to a control section 8 incorporating a CPU, etc. therein. Based upon the result of calculations performed using the information of these signals a control signal is supplied from control section 8 to coil 21 in the form of electric current having a respective value (Amperes).

For supplying the current to coil 21 a driving circuit associated to coil 21 can be used (not shown). Open/closed states of the line switching valve 58, the on-off valve 62, etc. (FIG. 2) also are switched by control of output signals from control section 8.

Figure 1:
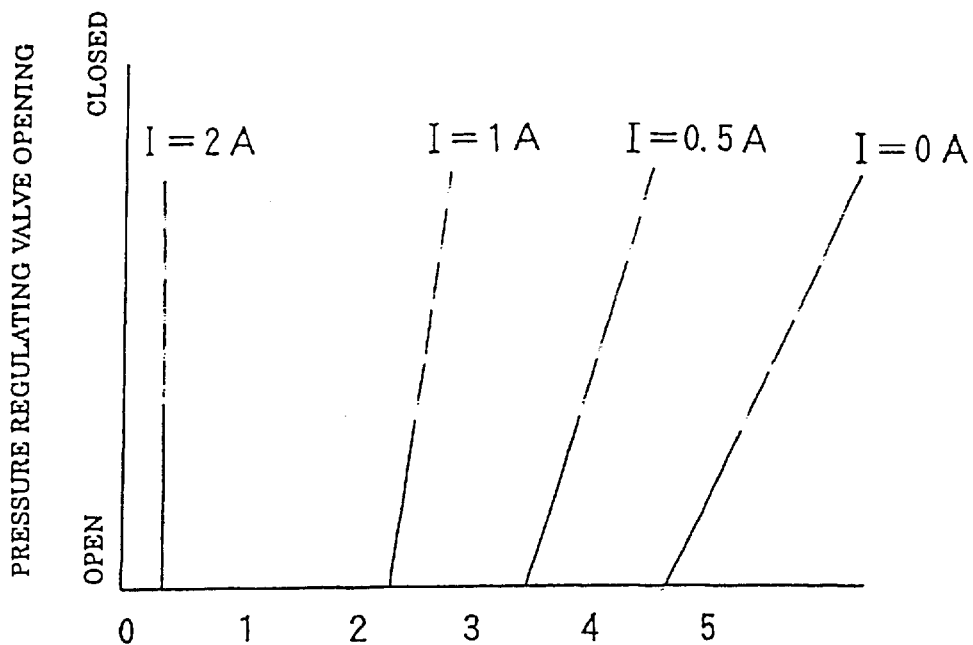
FIG. 1 a diagram showing characteristics of a capacity control valve for a variable capacity compressor for different control current values, FIG. 2 a block diagram of a vehicular refrigerating cycle, FIG. 3 a diagram showing a part of a variable capacity compressor and its associated to capacity control valve, and FIG. 4 a longitudinal detail sectional view of the capacity control valve.

FIG. 1 illustrates the opening characteristics of pressure regulating valve 25, 25a, 26 of capacity control valve 20 for to different values of the driving current supplied to coil 21. A maximum continuous operation current value (rated current value) by which the coil 21 is not damaged by burning is e.g. 1 A. For this reason, conventionally, the current supplied to coil 21 is limited so as not to exceed 1 A (Ampere). However, according to the invention, the current supplied to coil 21 can be adjusted to a value of even 2 A (Amperes) which value is larger than the value of the original rated current value of 1 A for coil 21. Said 2 A current is supplied to coil 21 only for a short period of time immediately before refrigerant is passed through the by-pass line 55 without being passed through condenser 52 (i.e. for about 30 seconds to about 1 minute) e.g. during a state in which the refrigerant passes through the condenser 52 without being directed into by-pass line 55.

As a current with a value of 2 A is passed through the coil 21 the suction pressure Ps is allowed to decrease to about 0.3 atmospheres (absolute atmospheric pressure) and the pressure in the evaporator 54 decreases correspondingly. This is due to the fact that by the high current of 2 A the residual closing force for valve element 25 becomes very weak so that suction pressure Ps is able to maintain the open state of said valve and to maintain control pressure Pc on a similar low level resulting in a continued maximum capacity setting of the compressor. Accordingly, even in an environment of extremely low temperature, the refrigerant stored in the condenser 52 will be conveyed towards the evaporator 54 and the accumulator 56. As soon as after the above-mentioned time period the overcurrent value of 2 A has ended and a current setting as desired e.g. 1 A is made, pressure regulating valve 25, 25a, 26 will close with low suction pressure Ps resulting in an increase of control pressure Pc via leak passage 7. The capacity of the compressor starts to decrease from maximum. The refrigerating cycle switched into the heating mode in which the refrigerant is passed through the by-pass line 55 with the line switching valve 58 switched, on-off valve 62 closed, then provides a satisfactory heating effect by evaporator 54.

The invention is not limited to the described embodiment decreased above. If, e.g., the value of current supplied to coil 21 for said time period and/or said time period is controlled such that the capacity of the compressor 10 starts to decrease from its maximum capacity at a suction pressure Ps of 2 atmospheres (absolute atmospheric pressure) or even less, a satisfactory heating effect can be achieved by the evaporator 54 in an ambient temperature range of about −10° C. and above. If, e.g., the capacity of the compressor 10 is allowed to start to decrease from its maximum capacity at a suction pressure Ps of 1 atmosphere (absolute atmospheric pressure) or even less, a satisfactory heating effect can be achieved by the evaporator 54 in a temperature range of about −30° C. and above. Furthermore, the variable capacity compressor 10 instead can be a rotary type or a scroll type, for example. The capacity control valve 20 instead may be of a type using a diaphragm, bellows or the like.

Basically, the capacity control valve 20, particularly in an environment of extremely low atmospheric temperature and with the refrigerating cycle left at rest after cooling mode operation, with the refrigerating cycle firstly adjusted for cooling mode, is actuated by higher current for a predetermined short period of time prior to a heating mode operation such that the start of the decrease of the capacity of the compressor from the maximum capacity setting or a relatively high capacity setting, respectively, is postponed until the suction pressure Ps decisive for the evaporator pressure intentionally becomes lowered to a value sufficient to also decrease the evaporator pressure and to convey refrigerant stored beforehand in the condenser out of the condenser for upcoming heating purposes. The significant decrease of the suction pressure Ps results from the intentionally maintained maximum capacity setting of the compressor. The value of the suction pressure Ps at which the compressor capacity starts to decrease can be freely set by adjusting the value and/or the duration time period of the overcurrent. Since said overcurrent only is supplied for a relatively short period of time it can have a magnitude which could be of harm for the coil only if maintained continuously. As a consequence, since the solenoid can stand the short time electric overload easily, no modifications of the capacity control valve are necessary. Except at the control side no significant modifications are needed for the improvement of the vehicular refrigerating cycle.

What is claimed is:

1. A vehicular refrigerating cycle comprising a compressor, a condenser for condensing refrigerant compressed by said compressor, an expansion valve, an evaporator for evaporating refrigerant adiabatically expanded by said expansion valve, a by-pass line detouring said condenser, a line switching means for supplying compressed refrigerant either to said condenser or into said by-pass line, and a capacity control means for variably controlling the capacity of said compressor corresponding to variations of its own suction pressure, said compressor being a variable capacity compressor the capacity of which automatically is decreasing with a reduction of its suction pressure, wherein said capacity control means is provided with setting means allowing the capacity of said compressor to begin to decrease from a maximum capacity first under a suction pressure of 2 atmospheres (absolute atmospheric pressure) or less in a state in which the refrigerant flows through the condenser without passing through said by-pass line.

2. Vehicular refrigerating cycle as in claim 1, wherein said setting means allow the capacity of said compressor to begin to decrease from a maximum capacity first under a suction pressure of 1 atmosphere (absolute atmospheric pressure) or less in a state in which the refrigerant flows through said condenser without passing through said by-pass line.

3. Vehicular refrigerating cycle as in claim 1, wherein said capacity control means comprises a solenoid, and an overcurrent supply to temporarily pass overcurrent through the solenoid prior to a state with refrigerant directed through the by-pass line without passing through said condenser, such that the capacity of the compressor starts to decrease from the maximum capacity first when a predetermined low value of said suction pressure or less has been reached.

4. Vehicular refrigerating cycle as in claim 1, wherein said capacity control means are constituted by a solenoid actuated pressure regulating valve in a flow connection between a suction pressure line and a control pressure line, a value of a control pressure in said control pressure line determining the capacity of said variable capacity compressor between a maximum and a minimum, said valve controlling said flow connection between open and closed states in dependence from a relation between a valve closing force mainly depending on current supplied to said solenoid and an opening force generated by said suction pressure, and wherein said solenoid is connected to a current setting means for temporarily supplying an overcurrent to said solenoid for assuring said valve open state until said suction pressure has decreased to said value of about 2 atmospheres or less.

5. Vehicular refrigerating cycle as in claim 4, wherein said current setting means is adapted to supply said overcurrent with a magnitude approximately double as high as a maximum magnitude of a continuous operation current for a long duration heating and/or cooling mode operation of said refrigerating cycle.

6. Vehicular refrigerating cycle as in claim 5, wherein said over current is supplied for a short period of time immediately before refrigerant is allowed to pass through said by-pass line to reduce said suction pressure to a value of about 2.0 to 0.3 atmospheres, said short period of time amounting to about 30 seconds to about 1 minute.

7. Refrigerating cycle as in claim 5, wherein the current setting means comprises a driving circuit connected to a control section including a control signal calculating CPU, said control section being connected to detection signal emitting sensors e.g. for engine operation conditions, temperatures inside and/or outside the vehicle, temperatures and/or pressures in the evaporator, etc.

* * * * *